United States Patent Office 3,259,358
Patented July 5, 1966

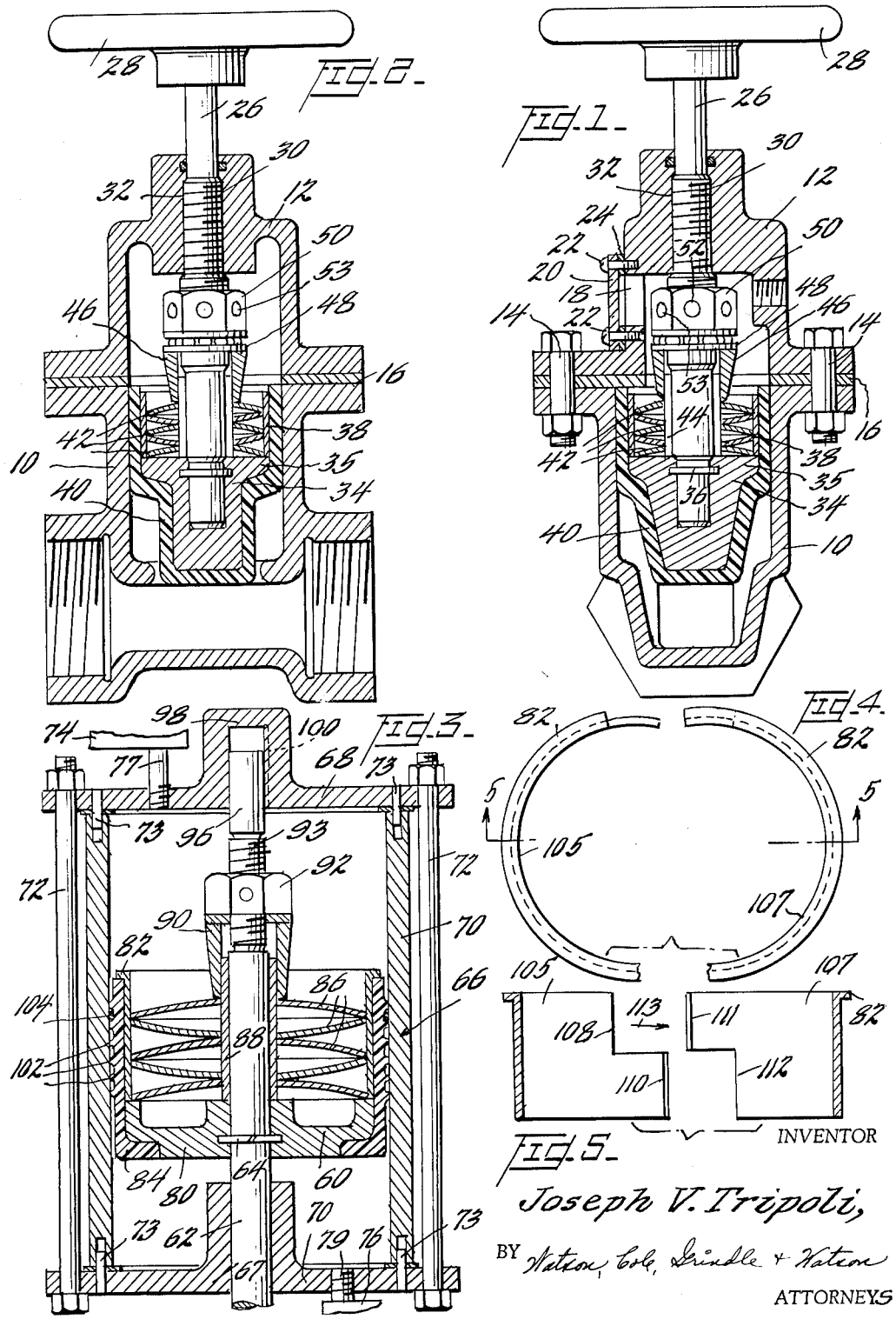

3,259,358
FLOW CONTROL MEMBER HAVING A RADIALLY BIASED SEAL
Joseph V. Tripoli, Kenmore, N.Y.
(329 Troy-Del-Way, Williamsville 21, N.Y.)
Filed Feb. 28, 1962, Ser. No. 176,395
10 Claims. (Cl. 251—214)

This invention relates to fluid flow control systems and, more particularly, to an improved flow control member.

Priorly, numerous forms of flow control members such as valves have been employed which incorporate structure for increasing the pressure of the valve member on the valve seat to thus prolong the wear and reduce leakage. In these systems, however, solid wedge shaped, or frusto-conical members have been employed as the valve member and the structure has included apparatus for increasing this pressure between the valve and the valve seat by increasing the pressure on the wedge. In gate types of valves, it is known to employ a pair of wedges mounted on a single valve stem and moved into position opposite the adjacent valve seats.

It is also known to use springs in the valve members to increase the seating pressure by applying a force normal to the direction of movement of the wedge, or frusto-conical valve member. In these types of devices the springs are usually of the helical type and are positioned with their axes perpendicular to the axes of the stems. In the instances in which the springs have their axes parallel to that of the stem, the valve member is a solid frusto-conical member or a solid wedge in which the force of the spring is exerted in a direction parallel to the stem axis to thus increase the seating pressure. These devices exhibit numerous disadvantages. For example, they are not suitable for use in gate type valves in which the walls of the valve body are parallel. Further, they are not suitable for flow control devices such as pistons in which the piston is to maintain a uniform seal with the cylindrical inner surface of the housing while the piston moves from one position of the housing to another.

Accordingly, it is an object of this invention to provide an improved fluid control device which obviates the above-mentioned disadvantages.

It is another object of this invention to provide an improved flow control device with an improved flow control member.

It is another object of this invention to provide an improved fluid piston.

It is still another object of this invention to provide an improved cylindrical fluid control member with an arrangement for adjusting the diameter thereof, thereby maintaining a substantially constant fluid seal.

Briefly, in accordance with aspects of this invention, I have discovered that an improved flow control device can be employed with a cylindrical housing, a valve member, a cylindrical skirt on the valve member, and a combination of elements within the cylindrical skirt to increase the diameter of the skirt and thus increase the seating pressure. In one illustrative embodiment of this invention, I employ a valve housing having a cylindrical inner surface, a valve member having a covering thereon, preferably of flexible material such as Teflon, a split metal cylinder within the covering, and a number of Belleville washers on the stem. A wedge is mounted on the stem on the opposite side of the washers from the valve member and a nut is threadably mounted on the stem adjacent the wedge. When the nut is rotated in a direction to move the wedge toward the washers, the washers are compressed causing them to expand diametrically. The expanded washers exert a force on the split ring which, in turn, forces the flexible covering against the cylindrical wall of the housing thereby increasing the sealing action of the valve member. Thus, the ability of the valve to provide a good fluid seal may be maintained substantially constant even though the flexible covering material wears during usage and would otherwise decrease the sealing capabilities of the valve. Also advantageously, a ball bearing race with a series of bearings therein is inserted between the nut and the wedge to reduce the resistance exerted upon the nut when the nut is rotated relative to the stem. Still further, in this illustrative embodiment, the valve housing and particularly the valve bonnet is provided with a removable window so that the adjusting nut may be actuated without dismantling the valve and while the valve is in use.

In accordance with another illustrative embodiment of this invention, a cylindrical piston is reciprocably mounted within a cylinder which has fluid inlets on opposite ends. A supply of fluid is connected to the inlets and fluid is introduced selectively to one end or the other of the housing to move the piston relative to the housing. A pistol rod is connected to the piston and passes through the end wall of the cylinder. The piston is formed by a cylindrical cup shaped member, a cartridge defining one end wall of the piston, an annular ring, or skirt, depending from the cartridge, a flexible fluid seal between the cartridge, ring, and the inner wall of the cylindrical chamber. A combination of adjustable nut, wedge, and Belleville springs is mounted on the piston rod in a position to expand the ring by rotation of the nut in a direction to move the nut and the wedge toward the cartridge thereby compressing the Belleville springs. It is important that fluid operated pistons maintain a close cooperative relationship with the inner wall of the cylinder. This novel combination of elements permits adjusting the diameter of the piston and thereby assures a constant close seal which greatly improves the operation of this device. It is, of course, understood by those skilled in the art that this device may be either hydraulically or pneumatically operated.

In accordance with still another illustrative embodiment of this invention, a piston is provided with a stem which is to be reciprocated by a power source, the piston including an end member fastened to the end of the stem, a cylindrical sleeve depending from the edge of the end member, the end member and sleeve being substantially inclosed by flexible covering and a torsion spring connected between the stem and the sleeve such that the force exerted on the sleeve can be increased by rotating the stem relative to the end member and sleeve, or apron. Advantageously, the stem may be rotated in one direction to increase the effective diameter of the piston or it may be rotated in the other direction to decrease the effective diameter.

These and various other objects and features of the invention will be more clearly understood from a reading of the detailed description of the invention in conjunction with the drawing in which:

FIGURE 1 is a view, in elevation, partly in section, of one illustrative embodiment of this invention;

FIGURE 2 is a view of the embodiment of FIGURE 1 taken on a plane normal to that of FIGURE 1;

FIGURE 3 is a view, in elevation, partly in section, of another illustrative embodiment of this invention;

FIGURE 4 is a plan view of the halves of the annular ring employed in FIGURE 3;

FIGURE 5 is a view, in elevation, taken along the line 5—5 of FIGURE 4.

Referring now to FIGURES 1 and 2, there is depicted one illustrative embodiment of this invention in the form of a gate type valve. This embodiment includes a valve body 10 which is covered by a bonnet 12, the bonnet being secured to the body by means of nut and bolt assemblies 14 with a suitable gasket 15 between the cooperating flanges of the body 10 and bonnet 12. The bonnet 12 has an aperture 18 in one side thereof, which aperture is covered by a transparent window 20 which is secured in position by means of screws 22, a gasket 24 being retained between the window 20 and bonnet 12. A stem 26 is rotatably mounted in the bonnet 12 and, in this particular instance, has a hand wheel 28 thereon for rotation of the stem. The stem 26 has a threaded portion 30 which threadably engages a threaded portion 32 in the bonnet 12. A gate member 34 is mounted on the end of the stem 26 opposite the hand wheel 28. This gate member includes an end member 35 which is connected to the stem by means of a snap ring 36 such that the snap ring 36 permits relative rotation between the stem 26 and the end member 35. Depending from the end member 35 is a cylindrical ring 38. Advantageously, this ring 38 may be split in one or more places to permit relative movement between portions of the ring so that it may freely expand in response to a force applied to its inner surface. The end member 35 and the ring 38 are substantially inclosed in a covering 40 of flexible material which may advantageously be Teflon or a combination of malleable iron and Teflon.

In this particular embodiment, an outward force may be selectively applied to the interior of the ring 38 by means of a Belleville spring arrangement which includes a plurality of Belleville springs 42 encircling the stem 26 and secured in position by means of a guide sleeve 44. A sliding sleeve 46 is slideably mounted on stem 26 and is engaged by a ball bearing race 48. An adjusting nut 50 abuts race 48 and threadably engages the stem 26. In this particular embodiment, nut 50 has a set screw 52 positioned to engage the stem 26. Whenever it is desired to modify the sealing relationship between the valve body 10 and the valve member 34, the window 20 is removed by means of the screws 22 and a wrench is inserted and the adjusting nut 50 rotated in the desired direction and the set screw tightened. In addition to the hexagonal surface, nut 50 has a plurality of holes 53 in which a rod may be inserted to turn the nut. Thus, if the adjusting nut 50 is rotated to move in a direction toward the gate member 34, the pressure exerted by the sleeve 46 on the Belleville washers or springs 42 increases causing the Belleville springs to compress and thereby increase the force on the inner surface of the ring 38.

Referring now to FIGURE 3, there is depicted another illustrative embodiment of this invention. This embodiment is referred to as a piston and cylinder arrangement in which a piston 60 is mounted on rod 62 by means of a snap ring 64 and the piston 60 is inclosed by a cylindrical chamber 66 which includes end walls 67 and 68, and a cylindrical wall 70. The assembly is held together by means of nut and bolt assemblies 72 which engage the flanges of the end walls 67 and 68. A number of dowels 73 are positioned around the end walls 67 and 68 to facilitate alignment of the cylindrical wall 70 relative to the end walls 67 and 68. A pair of fluid sources 74 and 76 are connected to communicate with the interior of the cylinder 66 by means of pipes 77 and 79, respectively. The term "fluid source" is employed in a generic sense to mean any source of fluid, either hydraulic or pneumatic, and the fluid source may provide fluid at greater pressure than the fluid pressure within the cylinder 66. It is, of course, possible to combine fluid sources 74 and 76 into a single source if a selective valve system is employed selectively to deliver fluid under pressure to pipes 77 and 79. In other words, if fluid under pressure is introduced into the cylinder 66 through pipe 77, the piston 60 will be moved downwardly, as viewed in FIGURE 3. Similarly, if fluid under pressure is introduced through pipe 79, piston 60 will be moved upwardly, as viewed in FIGURE 3.

Advantageously, the fluid seal defined between piston 60 and the inner surface of wall 70 may be adjusted. The piston 60 is formed by an end member or cartridge 80, an annular ring 82, and a flexible covering for the cartridge and ring 84. A plurality of Belleville springs, or washers, 86 encircle the rod 62 and maintain a snug relationship between the ring 82 and the rod 62 by means of sleeve 88. A sleeve 90 encircles the rod 62 and engages the last of the Belleville springs 86. The force applied through the sleeve 90 to the Belleville springs 86 is determined by the nut 92 which threadably engages a threaded portion 93 on rod 62 and engages sliding sleeve 90 through a washer 94. To maintain alignment between the rod 62 and the wall 70, the rod 62 is provided with an extension or end portion 96 which cooperates with a cylindrical inclosure 98 on the end wall 68. A suitable vent passage 100 is provided in this cylindrical extension 98 to prevent fluid pressure from opposing the movement of the rod 62.

In this particular embodiment, the sealing relationship between the piston 60 and the side wall 70 is controlled by nut 92. When nut 92 is rotated relative to rod 62 in a direction to move toward Belleville springs 86, the Belleville springs are compressed and the force applied through ring 82 to the covering 84 is increased. It is to be noted that the outer surface of this covering 84 has a series of ridges 102. Advantageously, an O-ring seal, such as seal 104, may be employed between each pair of these ridges 102 to improve the contact between the piston 60 and the side wall 70.

FIGURES 4 and 5 show plan and elevation views respectively of the rings which may be employed in conjunction with the springs to improve the fluid seal. In this particular instance, the ring 82 of the embodiment of FIGURE 3 is shown. Advantageously, this ring is formed in sections 105 and 107 which are joined together in cooperating steps or step-like surfaces best seen in FIGURE 5. When these surfaces, such as 108 and 110, are moved toward surfaces 111 and 112, as indicated by an arrow 113, an annular ring is formed. This ring is particularly suitable for use in combination with Belleville washers since it permits easy expansion of the ring to thereby increase the force on the resilient material which incloses the ring.

While I have shown several embodiments, it is understood that the concepts of this invention could be employed in other embodiments without departing from the spirit and scope of this invention.

What is claimed is:
1. A fluid control member comprising a housing, means for providing fluid flow relative to said housing, a flow-controlling member movable along an axis in said housing, said flow-controlling member including an end member having a gate member for restricting flow of fluid in said housing, an annular ring portion along the axis for sealing the flow-controlling member against a body cavity within said housing to prevent leakage of said fluid flow from said housing, said body cavity having a cylindrical wall mating with said annular ring portion, a flexible covering for said end member and said annular ring portion and means for apply a radial force to said annular ring portion thereby to improve the fluid seal between said flexible covering and the wall of said body cavity, said means for applying a force to said annular ring portion, including a stem connected to said end member, a plurality of Belleville springs encircling said stem and located within said annular ring portion so as to free the ends of said annular ring portion, and means for compressing said springs against said end member thereby increasing the effective diameter of said springs and thus applying a force on the inner surface of said annular ring portion to improve the fluid seal.

2. Apparatus according to claim 1 wherein said means for applying a force to said Belleville springs comprises a sleeve slidably mounted on said stem and a nut threadably engaging said stem on the side of said sleeve remote from said springs.

3. Apparatus according to claim 2 further comprising a window removably mounted on said body in the region of said nut whereby said window can be removed and the nut adjusted while the flow-controlling member is in operation.

4. Apparatus according to claim 1 wherein said fluid flow means communicates with said cavity of said housing only on one side of said flow-controlling member.

5. A cylindrical piston with a cylinder wall arrangement communicating with a source of fluid comprising in combination, an end member, an expandable annular ring portion, a series of Belleville springs located within the annular ring portion so as to free the ends thereof, said series of Belleville springs being arranged to exert radial outward pressure on the inner surface of said annular ring portion, a flexible material surrounding the annular ring portion and engaging the cylinder wall in sealing contact to prevent the flow of said fluid therethrough, adjustments means for selecting the compression of said springs within said annular ring portion against said end member to adjust the pressure of the flexible material against the wall, wherein the adjustment means provides a wear-compensation setting for maintaining a range of sealing contact between said material and the cylinder wall over a wider range than the self-adjusting range of the springs at any one adjustment.

6. A piston as defined in claim 5, wherein a fluid flow passageway communicates with said cylinder wall, said piston including a gating member in said passageway whereby when the piston moves said gating member is effective for controlling the flow of fluid through said passageway.

7. Apparatus according to claim 5 wherein said annular ring portion is split to facilitate expansion thereof in response to the radial pressure on the inner surface thereof.

8. Apparatus according to claim 5 wherein said annular ring portion is segmented to facilitate the expansion thereof in response to the radial pressure on the inner surface thereof.

9. Apparatus according to claim 8 wherein said annular ring portion is segmented by a pair of step-wise cuts substantially diametrically opposite each other to permit the application of a substantially uniform force to the flexible member in response to the radial pressure on the inner surface of said annular ring portion.

10. Apparatus according to claim 5, wherein adjacent springs of said series engage each other in face-to-face contact.

References Cited by the Examiner
UNITED STATES PATENTS

| | | | |
|---|---|---|---|
| 308,239 | 11/1884 | Campbell | 92—199 X |
| 379,711 | 3/1888 | Morrill | 92—199 |
| 490,913 | 1/1893 | Lee | 277—147 |
| 1,536,426 | 5/1925 | Deakins | 92—193 |
| 1,577,570 | 3/1926 | Egli | 92—199 X |
| 1,636,559 | 7/1927 | Haines | 137—559 X |
| 2,076,118 | 4/1937 | Buchanan | 92—199 |
| 2,702,220 | 2/1955 | Johnson | 92—254 X |
| 2,925,246 | 2/1960 | Sardeson | 251—191 |
| 2,964,289 | 12/1960 | Schmitz | 251—175 |
| 3,058,718 | 10/1962 | Johnson | 251—214 |

ISADOR WEIL, *Primary Examiner.*

C. GORDON, *Assistant Examiner.*